Figure 1:
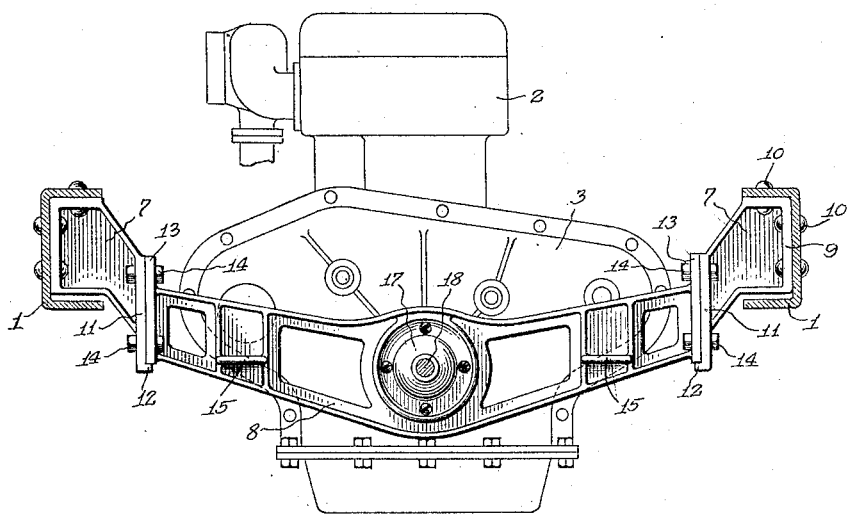

May 26, 1925. 1,538,988

J. C. HAGGART, JR

MOTOR SUSPENSION SUPPORT

Filed Sept. 26, 1923

Inventor
John C. Haggart Jr,
By
Attorney

Patented May 26, 1925.

1,538,988

UNITED STATES PATENT OFFICE.

JOHN C. HAGGART, JR., OF ALMA, MICHIGAN, ASSIGNOR, BY MESNE ASSIGNMENTS, TO DETROIT PATENTS HOLDING COMPANY, OF DETROIT, MICHIGAN, A CORPORATION OF MICHIGAN.

MOTOR-SUSPENSION SUPPORT.

Application filed September 26, 1923. Serial No. 664,878.

*To all whom it may concern:*

Be it known that I, JOHN C. HAGGART, Jr., a citizen of the United States of America, residing at Alma, in the county of Gratiot and State of Michigan, have invented certain new and useful Improvements in Motor-Suspension Supports, of which the following is a specification, reference being had therein to the accompanying drawings.

In the construction of automobile trucks, tractors and other motor vehicles, it is the present practice to provide chassis or side frame of the vehicle with a transversely disposed front end bearing or member made of one piece mounted between the side frames of the chassis for supporting the front end of the power plant of the vehicle, and in consequence of such a one piece supporting member it is necessary to completely remove the member when access is to be had to the power plant for removing any interior part thereof or any large exterior part, for instance the cover of a gear casing. This necessitates time and labor and very often it is necessary to remove a power plant in order that easy access may be had to a part thereof without interference by the vehicle chassis.

To permit of easy access being had to the forward end of a power plant supported in or about the chassis by a forward front end bearing is the main purpose of my invention and in order that the same may be easily and quickly accomplished, I have provided a multi-part front end bearing, preferably composed of three parts, two of which are fixedly held by the side frames or chassis of the automobile, and the remaining part interposed and detachably connected to the fixedly held parts. The interposed and detachably held part may be easily removed without disturbing the vehicle chassis or side frames and when removed affords sufficient clearance for disassembling any part or the whole of the power plant. Parts of the front end bearing are designed to afford a rigid and substantial structure between the side frames of the chassis and it is practically impossible for the detachable part of the front end bearing to become accidentally displaced during the use of a vehicle equipped with the same.

The construction entering into my invention will be hereinafter described and then claimed, and reference will now be had to the drawing wherein—

Figure 2:
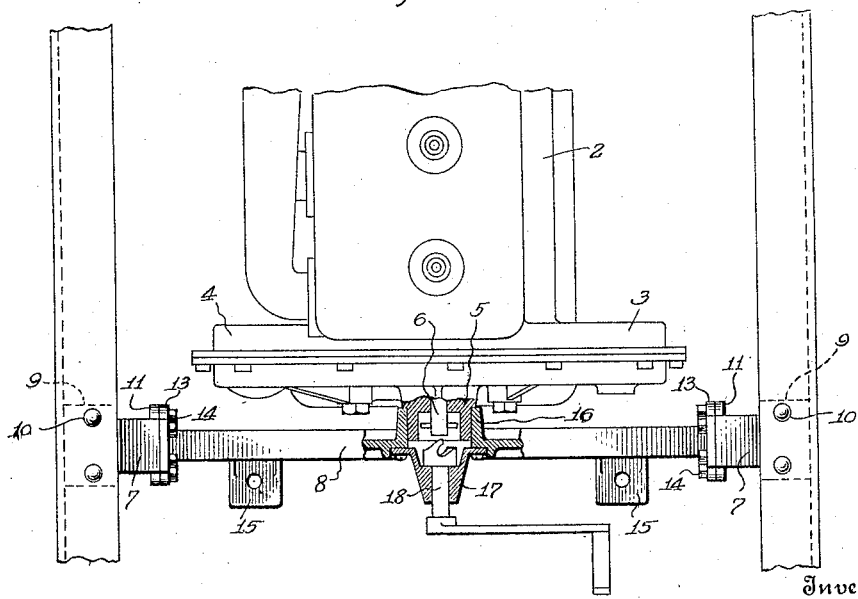

Figure 1 is a front elevation of the front end bearing relative to the side frames of a vehicle chassis and the power plant, and Fig. 2 is a plan of the same partly broken away and partly in section.

In the drawing, I have shown channel side frames 1 of a vehicle chassis and between the side frames is a conventional form of engine or power plant 2 which may include a gear casing 3 having a detachable cover 4 and a hollow bearing boss 5 in which is journaled the forward end of the engine crank shaft or a starter shaft 6.

As set forth in the beginning the hollow bearing boss 5 is ordinarily supported by a one piece rigid transverse member carried by the side frames 1, and as a substitute for such one piece member I provide a three piece member, composed of end parts 7 and an interposed part 8.

The end parts 7 have the outer ends thereof somewhat channel shaped, as at 9, and fixedly held within the side frames 1 by rivets 10. The end parts 7 extend downwardly at an angle to the side frames 1 with the inner ends thereof terminating in face plates 11 having bottom shoulders or ledges 12.

The interposed part 8 has its ends provided with face plates 13 mounted on the shoulders or ledges 12 and detachably held against the face plates 11 by nut equipped bolts 14. Adjacent the ends of the interposed part 8 are radiator supports 15.

Intermediate the ends of the interposed part 8 is a bearing 16 for the boss 5 and detachably mounted in the front end of the bearing 16 is a bearing 17 for a starting device 18, which may be in the form of a reciprocable and rotatable shaft having a crank at its outer end and a clutch member at its inner end adapted to interlock with the forward end of the shaft 6.

The interposed part 8 is of greater length than the width of the gear casing 3 and it is obvious that by removing the nut equipped bolts 14 that the interposed part 8 may be bodily moved forward and slipped off of the boss 5, thus opening the forward end of the chassis so that easy access may be had to the gear casing 3 or the forward part of the power plant. The end parts 7 at all times remain in engagement with the side frames 1 and are adapted to cooperate with the interposed part 8 in providing a multi-part front end bearing for the power plant of the vehicle. The parts of the front end bearing are webbed, ribbed and reinforced throughout so as to obtain maximum strength and rigidity with minimum weight.

One embodiment of my invention has been illustrated, but it is to be understood that the structural elements are susceptible to such variations and modifications as fall within the scope of the appended claim.

What I claim is:—

In a vehicle chassis wherein an engine is supported with its crank shaft below the plane of the chassis, a transverse supporting member comprising fixedly held chassis parts extending inwardly and downwardly from the sides of the chassis, a detachable interposed part connecting said fixedly held parts, said interposed part being of the eye beam construction with its rear face affording a trunnion for the engine, and a starter shaft bearing carried by the front face of said interposed part.

In testimony whereof I affix my signature in presence of two witnesses.

JOHN C. HAGGART, Jr.

Witnesses:
H. J. WILSON,
LESTER OSBORN.